US012741733B2

(12) United States Patent
Morrey

(10) Patent No.: US 12,741,733 B2
(45) Date of Patent: Sep. 22, 2026

(54) HIGH-ALTITUDE AEROSTAT WITH A LARGE SURFACE AREA

(71) Applicant: Martin Morrey, East Lothian (GB)

(72) Inventor: Martin Morrey, East Lothian (GB)

( * ) Notice: Subject to any disclaimer, the term of this patent is extended or adjusted under 35 U.S.C. 154(b) by 120 days.

(21) Appl. No.: 18/859,280

(22) PCT Filed: Apr. 19, 2023

(86) PCT No.: PCT/GB2023/000022
§ 371 (c)(1),
(2) Date: Oct. 23, 2024

(87) PCT Pub. No.: WO2023/209319
PCT Pub. Date: Nov. 2, 2023

(65) Prior Publication Data

US 2025/0263163 A1 Aug. 21, 2025

(30) Foreign Application Priority Data

Apr. 24, 2022 (GB) .................................... 2205945
Apr. 14, 2023 (GB) .................................... 2305479

(51) Int. Cl.
*B64B 1/02* (2006.01)
*B64B 1/62* (2006.01)
*B64B 1/70* (2006.01)

(52) U.S. Cl.
CPC ................. *B64B 1/02* (2013.01); *B64B 1/62* (2013.01); *B64B 1/70* (2013.01)

(58) Field of Classification Search
CPC .... B64B 1/02; B64B 1/62; B64B 1/70; B64G 1/2227
See application file for complete search history.

(56) References Cited

U.S. PATENT DOCUMENTS 6,860,449 B1 3/2005 Chen
2003/0071168 A1* 4/2003 Barnes, III ................ B64B 1/02 244/30
2008/0030884 A1 2/2008 Hershkovitz
(Continued)

FOREIGN PATENT DOCUMENTS

CN 103303457 A 9/2013
CN 110979625 A 4/2020

OTHER PUBLICATIONS

Int'l. Search Report for PCT/GB2023/000022, dated Jul. 27, 2023.

*Primary Examiner* — Joshua J Michener
*Assistant Examiner* — Katherine June Walter
(74) *Attorney, Agent, or Firm* — MaxGoLaw PLLC

(57) ABSTRACT

A variable-volume aerostat, consisting of a flat gas envelope, joined to guide aerostat bodies. The flat gas envelope is typically deployed by rotation of cylindrical guide airships, or rollers suspended beneath guide aerostats. In its stowed configuration, the flat gas envelope is rolled, uninflated and relatively compact. As the invention ascends to high altitude, lifting gas expands out of the guide aerostats into the unrolling flat gas envelope. When fully deployed, the flat gas envelope is self-supporting, and has a horizontal surface area up-to 100 times larger than that of the guide aerostats. This is a major advantage in potential applications, including targeted Solar Radiation Management (SRM), and airborne solar power generation.

20 Claims, 10 Drawing Sheets

(56) References Cited

U.S. PATENT DOCUMENTS

| | | | | |
|---|---|---|---|---|
| 2014/0255139 | A1* | 9/2014 | Bernard | B64B 1/02 244/30 |
| 2018/0050784 | A1 | 2/2018 | Paulus | |
| 2018/0237141 | A1* | 8/2018 | Heppe | B64B 1/52 |
| 2019/0077510 | A1* | 3/2019 | Panas | H04W 4/40 |
| 2020/0096731 | A1 | 3/2020 | Komerath | |
| 2021/0347460 | A1* | 11/2021 | Watters | B64B 1/08 |
| 2024/0288082 | A1* | 8/2024 | Basta | F16K 15/028 |

* cited by examiner 104
102
104

104
102
104

136
102
131
131

132
133
130

HIGH-ALTITUDE AEROSTAT WITH A LARGE SURFACE AREA

TECHNICAL FIELD

The present invention is directed to a variable-volume aerostat, which can increase its horizontal area by a factor of up-to approximately 100, when it ascends to high altitude. It delivers an active layer of large area to high altitudes, which is valuable in applications which interact with direct sunlight, such as targeted solar-geoengineering, also known as Solar Radiation Management (SRM), airborne solar electricity generation, and climate adaptation.

BACKGROUND ART

Lighter-than-air craft such as balloons or airships, collectively known as aerostats, are well suited to aerial applications which require long-duration flight and minimum energy expenditure.

Airships can be of non-rigid, semi-rigid or rigid types. Non-rigid airships, also known as “blimps”, are gas envelopes which take on the shape of an airship when inflated to positive pressure. Semi-rigid airships have some rigid structure, but their overall shape still depends on positive pressure in the gas envelope. Rigid airships have a rigid frame supporting a skin of fixed shape, containing one or more gas envelopes. Rigid airships are typically heavier, but more robust and less prone to gas leakage.

The most suitable atmospheric environment for long-duration aerostats is the lower stratosphere (NPL2). In the stratosphere, the air is relatively stable most of the time, and a given wind or wind shear exerts a lower force, because the air is less dense.

For an aerostat to maintain its lifting capacity as it ascends, its envelope must continue to displace the same total mass of air. Following Boyle’s Law, at constant temperature, the volume of lifting gas must increase in inverse proportion to the decrease in pressure with altitude.

In most existing high-altitude aerostats, the gas envelopes are partially filled with lifting gas at ground level. As the aerostat ascends, the lifting gas expands, increasing the volume of the gas envelope, which displaces a greater volume of air.

Most contemporary designs for high-altitude airships are of the semi-rigid type (NPL2), but modern materials and techniques offer the potential for a lightweight rigid airship which can reach stratospheric altitudes. By way of example but not limitation, the rigid frame can be formed by inflated tubes (PTL3); or a hybrid of circumferential inflatable rings and a longitudinal carbon fibre skeleton (NPL3); or a core shaft truss with stiffening rings (PTL12)

Rigid airships sometimes include internal structures such as “ballonets” (PTL5), which are used to control buoyancy by actively changing the total volume of lifting gas. Transformable airships (PTL6, PTL11) are airships which can reconfigure their internal structure to change volume and surface area to a limited degree, e.g. “6-8 times” (PTL6).

Certain aerial applications require a large surface area. Airborne solar-power generation (PTL1,PTL7,PLT10) requires a large area of photovoltaic cells at high altitudes. Some existing designs (PTL1) require complex structures that must be unfolded at ground level, and deployed at a fixed location. Others (PLT10) require a separate reflector suspended by the force of any prevailing wind.

Some forms of Solar Radiation Management (SRM) require a large area of reflective surface, in order to direct incident solar radiation back into space. In existing designs for airborne SRM (PTL2), a non-buoyant reflective sheet is supported by one or more concentric inflated rings, and additional support balloons.

Long-duration airships require solutions for minimising or repairing leaks in the gas envelopes, such as a durable hull [PTL8] or autonomous repair systems [PTL9]

SUMMARY OF INVENTION

The invention is a new type of variable-volume aerostat, consisting of a flat gas envelope (102); which acts as the expansion volume for one or more aerostat bodies (104,132,136) attached to it. The gas cells inside these aerostat bodies are internally-connected to the interior of the flat envelope, enabling lifting gas to move between them.

The primary innovation is the use of a flat gas envelope to provide both the expansion volume required to ascend to high altitude, and a flat surface of the maximum-possible area, once deployed.

The invention is a solution for presenting a large surface area to direct sunlight, to support applications such as targeted Solar Radiation Management (SRM), airborne solar-power generation, or localised climate adaptation.

Deployment at high altitudes both increases the intensity of incident solar radiation, and reduces the risk of damage due to atmospheric disturbance.

In its stowed configuration, the flat gas envelope (102) is uninflated, and is typically rolled or folded for compactness and portability. Unlike existing high-altitude aerostats, the envelopes of each internally-connected aerostat body (104,132,136) can be fully-filled with lifting gas at launch, maximising ground lift capacity.

As the invention ascends, the flat gas envelope is gradually deployed, and the lifting gas in each internally-connected aerostat body (104,132,136) expands into the flat gas envelope.

In its deployed configuration at the target altitude, the flat gas envelope (102) is filled with lifting gas and neutrally buoyant. Depth-constraining structures (101), such as tendons, constrain the depth of the flat gas envelope and determine its shape. The inflated flat gas envelope is normally deployed in an approximate straight line between two aerostat bodies. This shape can be maintained by a relatively small amount of tension.

In the preferred embodiment, the “Rollable Aerostat”, each internally-connected aerostat body is an airship (104) which is cylindrical for most of its length. In its stowed configuration, the uninflated flat gas envelope (102) is rolled around the cylindrical body of the internally-connected airship(s). As the Rollable Aerostat ascends and descends, each internally-connected airship rotates to unroll and roll the flat gas envelope.

In the alternative embodiment, the “Suspended Roller”, one or more cylindrical rollers (131) are suspended beneath non-rotating internally-connected aerostat bodies (132,136). In the stowed configuration, the uninflated flat gas envelope (102) is rolled around these rollers. Motors (134) rotate the rollers to unroll and roll the flat gas envelope.

All forms of the invention are relatively compact and easy to handle in their stowed configuration, but are able to deploy a very large surface area to high altitudes.

Instances of the invention are designed to operate at a specific target altitude, which can be up-to approximately 25 km. The internal structures (101) inside the flat gas envelope are normally designed to make it neutrally buoyant along its length and width.

For SRM, the surface of the flat gas envelope is covered with a high albedo material or coating, which reflects a large proportion of incident solar radiation back into space.

For airborne solar power generation, the top surface of the flat gas envelope would be covered in flexible, thin film, UV resistant, photovoltaic cells.

The invention may be ground tethered or autonomous, depending on the requirements of the specific application, and the location where it is deployed.

Technical Problem

Solar Radiation Management applications require a very large surface area of material which reflects solar radiation, and which remains in situ over long time scales. A large non-buoyant surface (PTL2) would tend to hang downwards.

Airborne solar power generation requires exposure of a large surface area of photovoltaic cells, for long time-scales, to be economically viable.

Supporting these applications using a lighter-than-air platform, requires maximising the useful surface area delivered by an aerostat of a given volume, and delivering this surface to a sufficiently stable part of the atmosphere.

The lowest risk environment for long duration applications is in the lower stratosphere, which starts at altitudes above approximately 10 km at high latitudes to approximately 20 km in the tropics (NPL2).

Existing designs of stratospheric aerostats (NPL2), would only be able to deliver a relatively-small area of non-buoyant surface to high altitude, because their lifting capacity is small.

Shorter duration or periodic applications may sometimes be practical at low altitudes, but the risk of damage from atmospheric disturbance must be managed.

On its own, a flat gas envelope partially-filled with lifting gas at ground level, would be extremely cumbersome, vulnerable, difficult to deploy and operate, and difficult to retrieve.

The challenge in both applications is delivering a lighter-than-air platform which exposes the maximum surface area in its deployed configuration at high altitude, whilst having a stowed configuration which is subject to practical handling at ground level.

Solution to Problem

The solution is a hybrid aerostat system, of variable volume, which is compact at ground level, but can expand its surface area to the maximum possible, as it ascends to high altitude.

The essential features of the invention are as follows.

A flat gas envelope (102), which can be kilometres in width, provides the large surface area. It is made of a light material which is impervious to the lifting gas. The depth of the flat gas envelope is restricted by depth-constraining structures, such as tendons, to deliver neutral buoyancy along its width.

The flat gas envelope may have a single interior volume or be internally divided into cells. It may be a single envelope, or composed of multiple separate parallel strips.

One or more aerostat bodies connected to the flat gas envelope, provide the ground lifting capacity and lifting gas reservoir. The gas cells inside aerostat bodies which are internally-connected to the interior of the flat envelope, provide the lifting gas which expands into the flat gas envelope as the system ascends to high altitude.

In its stowed configuration, at low altitude, the flat gas envelope is uninflated, and may be rolled or folded. The gas cells inside each internally-connected aerostat body (104, 132,136) are typically fully-inflated with lifting gas. Since the flat gas envelope contains little or no lifting gas, its weight is wholly supported by the net lifting capacity of each internally-connected aerostat body.

As the invention ascends, and the ambient pressure decreases, the lifting gas expands out of each internally-connected aerostat body (104,132,136) into the flat gas envelope (102).

In its deployed configuration at the target altitude, the flat gas envelope (102) is completely unfurled and fully inflated, making it neutrally buoyant and self supporting. The lifting gas remaining inside each internally-connected aerostat body (104,132,136) provides enough lift to support its deadweight.

Depth constraining structures (101) constrain the depth of the flat gas envelope (102). When the average depth across a cross section of the flat gas envelope, consistently equals the depth of lifting gas required to offset the weight of the flat gas envelope at the target altitude, the flat gas envelope naturally adopts a horizontal position.

As shown in FIG. 12, The internally-connected aerostat bodies can be at one end of the flat envelope, a mono-connection layout; both ends of the flat envelope, a dual-connection layout; or in the middle of the flat envelope, a central-connection layout.

The maximum width of the flat gas envelope (102) is primarily constrained by the mass-per-unit-area of the uninflated flat gas envelope, and the net lifting capacity of the internally-connected aerostat bodies (104) at ground level.

Given a flat envelope of areal density σ, and a lifting gas of buoyancy $b_0$ at take off, and connected aerostats of total internal volume $V_a$ and total dead mass $m_a$, the maximum area of the flat envelope, A, is given by the following equation:

$$A = \left(\frac{1}{\sigma}\right)\left(\frac{V_a b_0}{g} - m_a\right) \tag{1}$$

Given atmospheric pressure and temperature at take-off of $P_S$ and $T_S$, and temperature at ceiling altitude of $T_C$, the pressure at the ceiling altitude, $P_C$ is given by the following equation:

$$P_C = P_S\left(\frac{T_C}{T_S}\right)\left(\frac{m_a g}{V_a b_0}\right) \tag{2}$$

The depth of the flat envelope d at pressure P and temperature T, is given by the following equation:

$$d = \frac{\sigma g}{b_0}\frac{P_S T}{P T_S} \tag{3}$$

The preferred features of the invention are as follows.

To prevent tearing, the flat gas envelope is typically reinforced with strong and lightweight ribbons or cables (115).

The flat gas envelope may be divided into separate sections, and may incorporate lightweight pipes (122,126) along its width to expedite the flow of lifting gas. These lightweight pipes can also act as the reinforcing structure, if made of a strong material. The pipes can include active or passive valves to control the flow of lifting gas.

In the deployed configuration, the flat gas envelope (102) can be kept in slight tension by thrusters (114) on the aerostat bodies (104,132,136), requiring a relatively small amount of power. End tethers (111) can also sometimes provide this tension.

If required, length of the depth constraining structures (101) can be varied to create other shapes and attitudes. An uneven spacing of the depth constraining structures can help suppress standing waves in the flat gas envelope.

The invention can be autonomous or tethered by light-weight tethers (111). There is a spectrum of possible autonomy, from systems physically controlled by end-tethers, through remote-controlled systems, to fully autonomous robotic systems.

Precise control is required over the aerostat bodies (104, 132,136), to avoid overstressing the flat gas envelope, and to avoid collision between aerostat bodies. In dual systems, telescopic booms extending inwards from each aerostat body, can also be used to manage separation during take-off and landing.

Autonomous examples include the energy storage (112), propulsion (114) and control systems necessary to control position, rotation, envelope tension, altitude, attitude and speed. Energy storage capacity is not always sufficient to travel at night, but must be sufficient to control orientation, and maintain slight tension in the envelope.

All embodiments can feature supplementary buoyancy at the aerostat bodies, or in the middle of the flat gas envelope. As illustrated in FIG. 7, in dual-connected examples an additional central airship body (127) can be used to support the weight of a central tether (111), or other centrally-mounted hardware, such as solar cells (103), and may also act as a compressible buffer between the two aerostat bodies at low altitude.

In the preferred embodiment of the invention, the "Rollable Aerostat", each internally-connected aerostat body is an airship (104) with a main body which is effectively cylindrical in shape, enabling the flat gas envelope (102) to be rolled around the main body of the airship.

Each cylindrical airship (104) has high radial symmetry, and an internal structure strong enough to transfer torque from the longitudinal axis to the cylindrical surface.

As the "Rollable Aerostat" ascends, controlled rotation of each cylindrical airship (104) gradually unrolls the flat gas envelope (102), enabling lifting gas to expand into it.

As the Rollable Aerostat descends, reverse-rotation rolls the flat gas envelope (102) back around each cylindrical airship (104), squeezing the lifting gas into the gas cells inside the airship.

As illustrated in FIG. 11, the minimum altitude required to access the lower stratosphere varies between approximately 10 km near the poles to up to 20 km in the tropics. In the summer polar stratosphere, zonal winds are relatively low (NPL2), and the sun is in the sky for a high proportion of the day, albeit at a low solar altitude angle. This comprises the most practical working environment for medium duration applications of the invention.

Existing rigid airships have a ceiling well below 10 km, but advanced materials and novel designs, such as frames incorporating inflatable beams (PTL3, NPL3), make higher altitudes possible.

Rigid airships with a cylindrical main body are easier to construct than conventional ellipsoid designs (NPL1).

Conventional semi-rigid airships have a rigid keel at the base of the envelope (NPL2). Semi-rigid cylindrical airships used for the aerostat bodies, have a rigid spine along their longitudinal axis. Unlike rigid cylindrical airships, semi-rigid cylindrical airships require gas pumps, valves and control systems to maintain positive interior pressure and exterior shape. The facility to pump lifting gas, potentially enables full deployment of the flat gas envelope (102) at any altitude.

In autonomous versions of the "Rollable Aerostat", torque for the rotation is applied either by counterweights (110) suspended from the longitudinal axis of a cylindrical airship (104), or weighted railcars (117) which move along rack rails (118) around the surface (123) of a cylindrical airship.

In the alternative embodiment, the "Suspended Roller", the flat gas envelope (102) is wound around a cylindrical roller (131), which is suspended below either a conventional airship (132), or assemblies of one or more non-rigid aerostats (136).

In the Suspended Roller, the gas pipes (116) which join the gas cells inside internally-connected aerostats to the flat gas envelope, are connected via a rotary union (135) on the axis of the roller. Motors (134) rotate the roller (131) to unroll and roll the flat gas envelope (102).

In both SRM and solar-electricity applications it is desirable to maximise its interaction with incident sunlight. A key factor in this, especially at high latitudes, is the ability to angle the envelope directly towards the sun.

Some examples have the ability to move internal weights longitudinally to completely change the pitch of the airships. The flat envelope can also include small moveable weights, or use pressure variations, to passively or actively follow the pitch of the airships. When wind conditions permit, these examples can change the pitch of the flat envelope to face the sun.

Asymmetric or variable buoyancy in the aerostat bodies can be used to create a slope along the width of the flat gas envelope in order to roll the invention towards the sun. Asymmetric or variable buoyancy can also create a vertical offset between the aerostat bodies at low altitude, reducing the risk of collision.

In SRM applications, it is desirable to minimise the interaction with terrestrial longwave radiation, especially during hours of darkness. This can be achieved by presenting as small a surface area as possible to the ground.

Some examples of the invention are designed to descend and roll-up during the night. Examples with full control of pitch and position, can put the flat gas envelope (102) into a vertical position, edge-on to the prevailing wind, during hours of darkness. Some examples may alternatively concertina the flat gas envelope during the hours of darkness.

In SRM applications, the upper layer of the flat gas envelope (102) is chosen to reflect as much solar radiation as possible back to space. To maximise the net impact on the Earth's radiation the envelope materials are also selected to maximise transparency to terrestrial longwave radiation.

In SRM applications, the flat gas envelope may be relatively simple and inexpensive. To maximise the surface area delivered by the more-complex guide aerostats, the flat gas envelope can disconnect from the guide aerostats at the target altitude, and float freely in the atmosphere. The guide aerostats are then able to descend to be refilled with lifting gas, and collect another flat envelope. In this case, the flat envelope may incorporate deeper regions or supplementary buoyancy at the ends, to support the weight of small thrusters.

Advantageous Effects of Invention

The invention maximises the surface area of an aerostat, at a target altitude, increasing it by a factor of up to 100.

The invention is relatively compact at low altitude, enabling practical handling and launching at ground level, and requiring only a relatively small footprint for storage.

The invention can deliver a very-large, radiatively-active layer, such as photovoltaic film, or a high-albedo surface, to high altitudes where sunlight is more intense, and the atmosphere is more stable.

The invention is made up of two simple and well understood components—aerostat bodies of a relatively standard design, and a flat gas envelope with depth-constraining structures.

The autonomous version of the invention is relatively manoeuvrable at low altitudes, and can be flown to the target location, before ascending to the target altitude.

The invention can actively adjust its position, angle and shape to maximise its interaction with sunlight, and to minimise its interaction with terrestrial longwave radiation.

The invention is a practical platform for targeted Solar Radiation Management, which can accurately reduce insolation in specific locations, such as those of high climate sensitivity, conservation concern, or with human habitation challenges.

The invention is a practical platform for airborne solar energy generation, especially suited to locations where there is scarcity of suitable or affordable land area, or for sun-following energy platforms.

Deployment at higher altitudes has several benefits to solar energy generation. The intensity of solar radiation intensity is increased, because there is less atmosphere above the system to scatter or absorb solar radiation. At stratospheric altitudes, the intensity of sunlight can be three times that at ground level. Losses due to shading by clouds are virtually eliminated. The low ambient temperature also minimises thermal losses in photovoltaic cells.

BRIEF DESCRIPTION OF DRAWINGS

The diagrams illustrate the basic components of the invention at launch, during ascent, or at the target working altitude. None of the diagrams are to scale. In particular, the relative width of the flat gas envelope is much less than in a real system.

DESCRIPTION OF EMBODIMENTS

All the embodiments can be used in either an autonomous or tethered solution, may feature supplementary buoyancy, and may be applied to SRM, solar power generation, or other high-surface-area applications.

All the embodiments can be formed in a range of different layouts of internally-connected and isolated aerostats, which by way of example but not limitation include the mono-connection; dual-connection; triple connection, or central-connection layouts illustrated in FIGS. 12*a* to 12*e*.

In the simplest embodiment, the flat envelope is not rolled on or under the connected aerostats. It may be folded at take-off and then released, or released at take-off in an open state. In smaller examples of the simplest embodiment, the isolated aerostats (151) can be left out of the layouts shown in FIGS. 12*a* to 12*e*. In this case, gas pressure alone shapes the flat envelope.

The preferred embodiment, the "Rollable Aerostat", is illustrated in FIGS. 1-4 in the dual-connected layout. In this embodiment the aerostat bodies are airships with a cylindrical main body (104). The cylindrical section of each internally-connected airship acts as a roller for stowing the uninflated flat gas envelope (102) at ground level, and deploying and retracting the flat gas envelope as the invention ascends and descends.

Figures 1A, 1B:
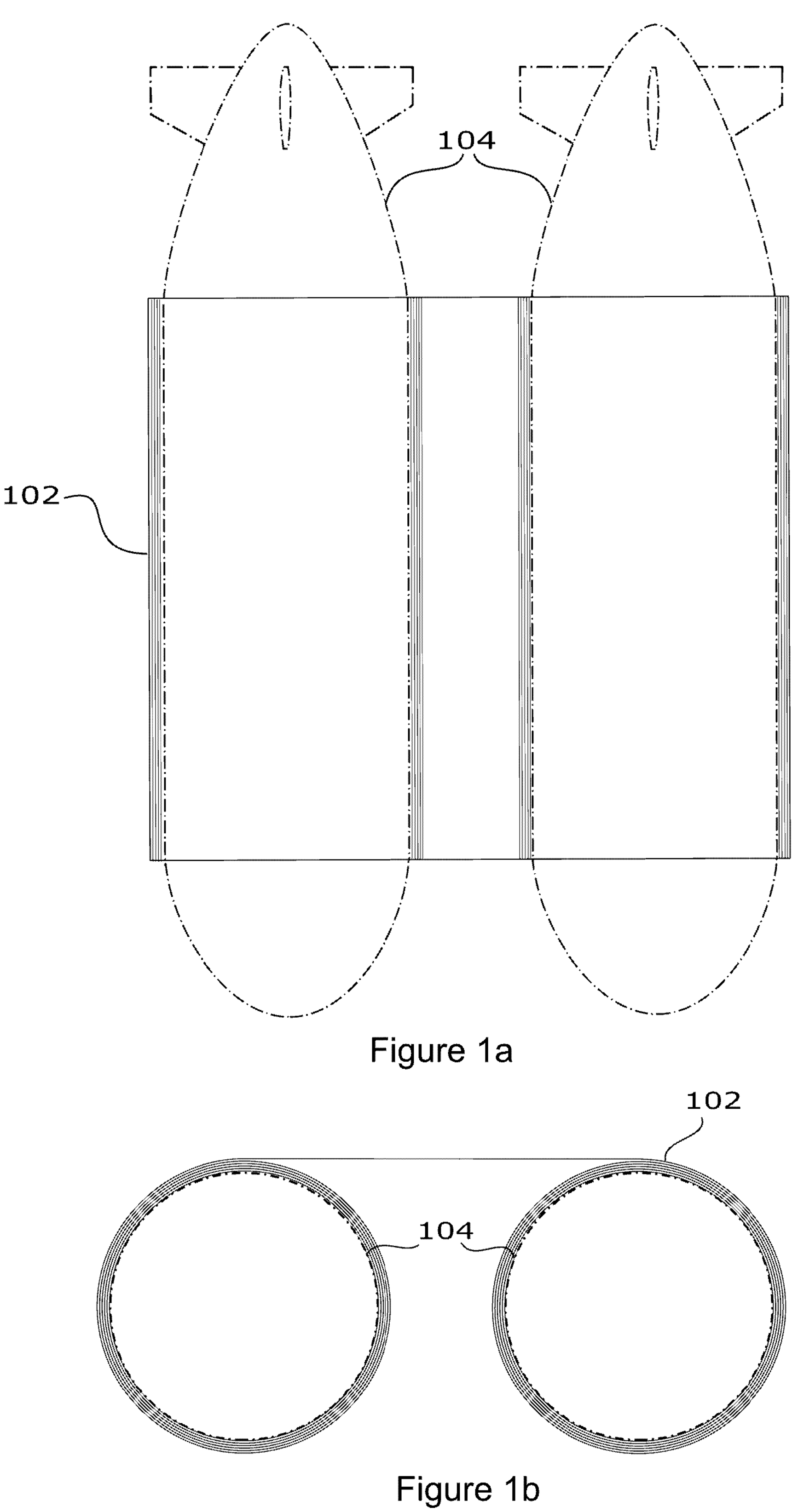
FIG. 1*a* shows a simplified plan view from above the “Rollable Aerostat” in its stowed configuration, showing the connected airships (104) with their cylindrical main body obscured by the uninflated flat gas envelope (102) wrapped around them.
FIG. 1*b* shows a simplified front section view of the “Rollable Aerostat” in its stowed configuration, showing the circular cross-section of the connected airships (104), and the uninflated flat gas envelope (102) wrapped around each cylindrical main body.
Figures 2A, 2B:
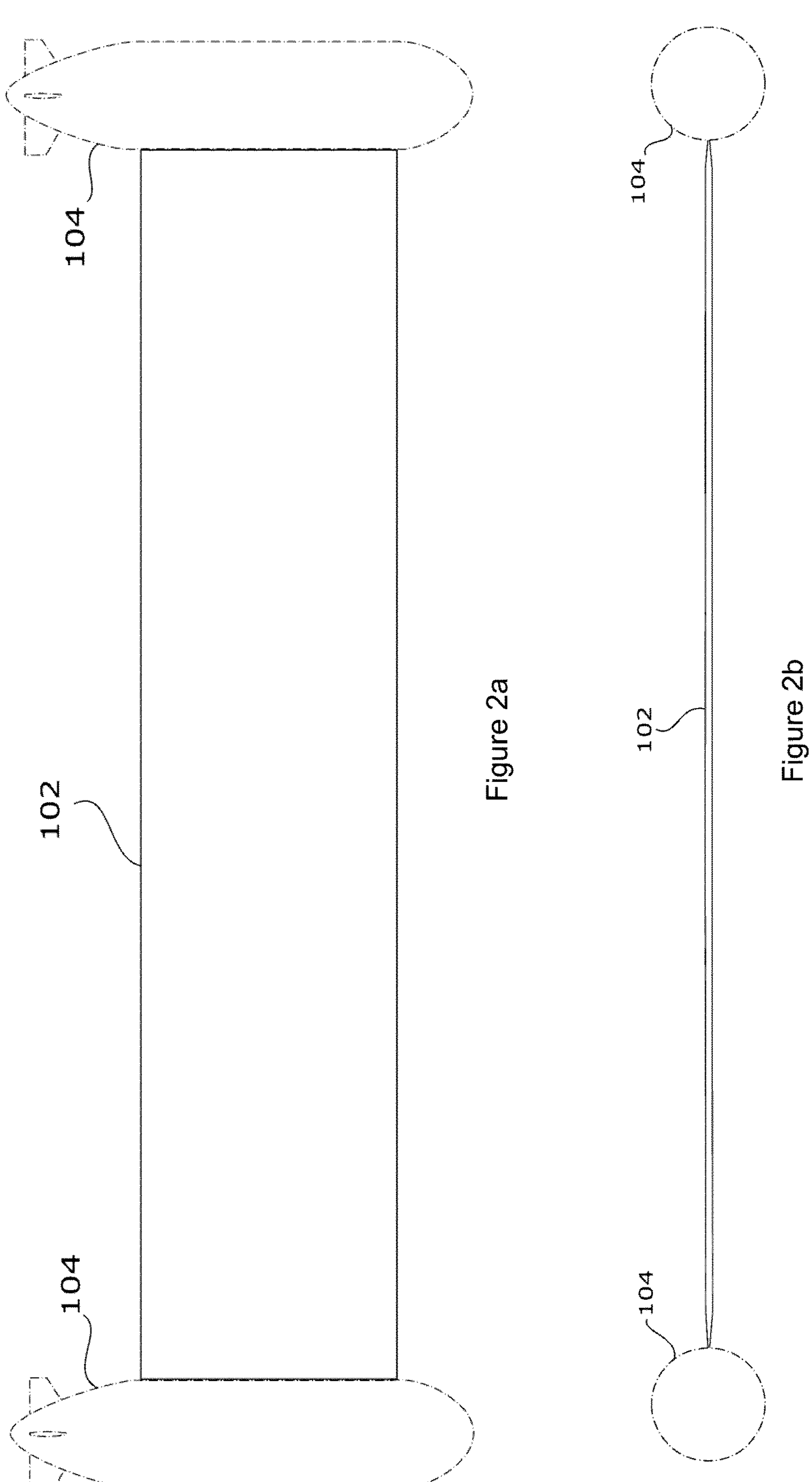
FIG. 2*a* shows a simplified plan view from above the “Rollable Aerostat” in its deployed configuration, showing the distanced airships (104), and the inflated and neutrally-buoyant flat gas envelope (102) extended between them.
FIG. 2*b* shows a simplified front section of the “Rollable Aerostat” in its deployed configuration, showing the circular cross-section of the distanced airships (104), and the inflated and neutrally-buoyant flat gas envelope (102) extended between them.
Figures 2C, 2D:
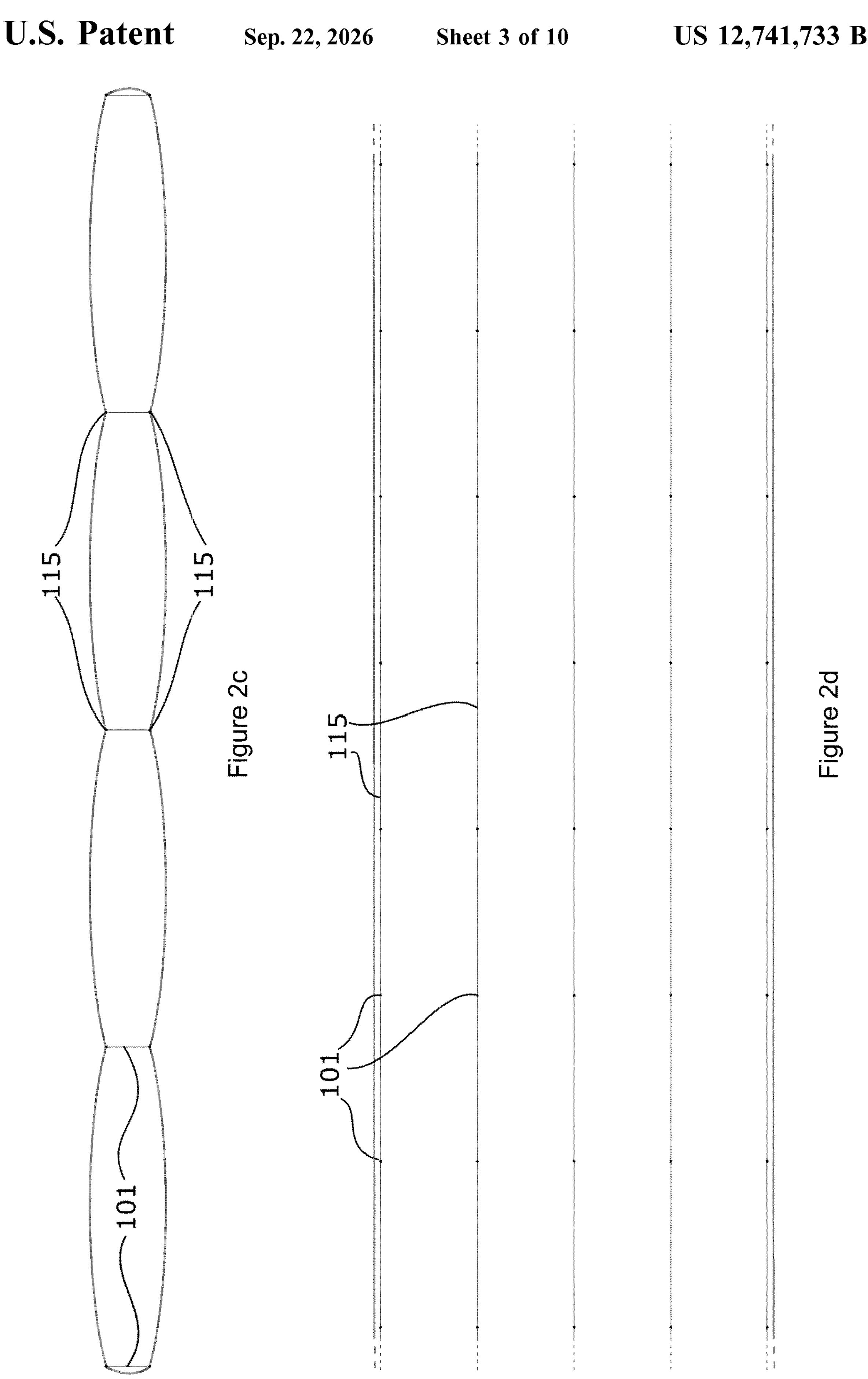
FIG. 2*c* shows a simplified section across the flat gas envelope in its deployed configuration, showing the depth constraining structures (101) and the cables (115).
FIG. 2*d* shows a detailed view from above the flat gas envelope in its deployed configuration, showing the depth constraining structures (101) and the cables (115).
Figure 3A:
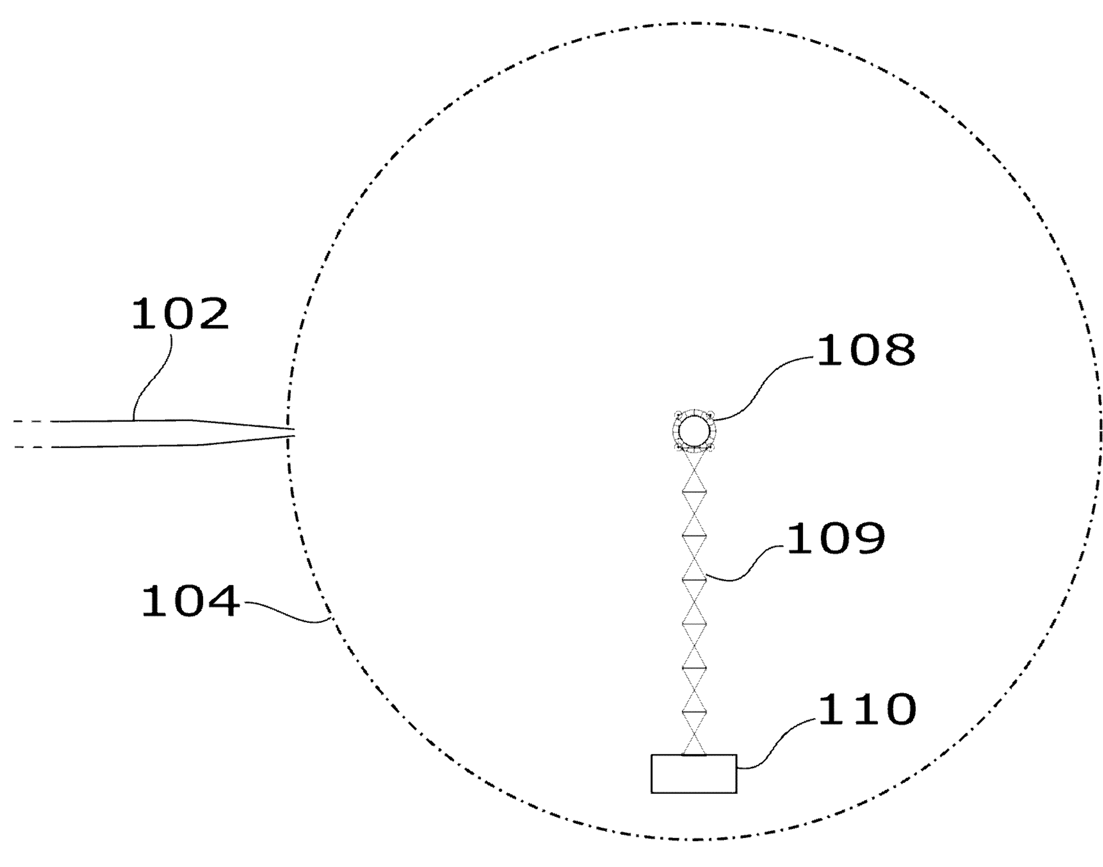
FIG. 3*a* is a cross-section view through one connected airship (104) in a “Rollable Aerostat”, showing the internal rotator, including the rotating mount (108), suspension frame (109), counterweight (110) and neutrally-buoyant flat gas envelope (102).
Figure 3B:
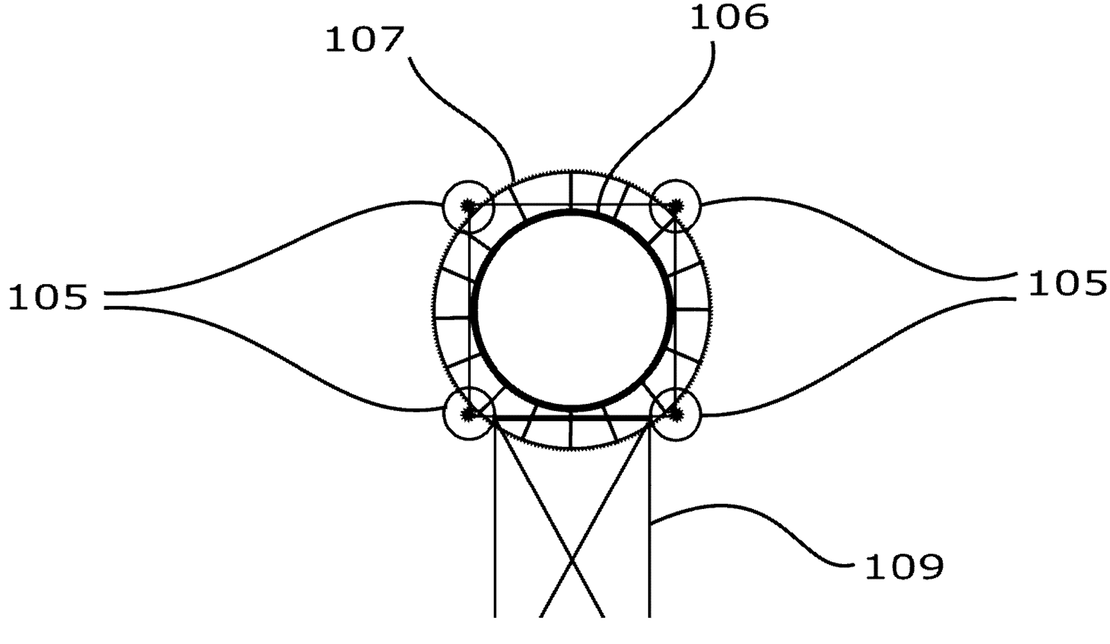
FIG. 3*b* is a detailed view of the rotating mount, illustrating electric motors (105) turning a large gear (107) attached to the central spine (106) of the airship.
Figure 4A:
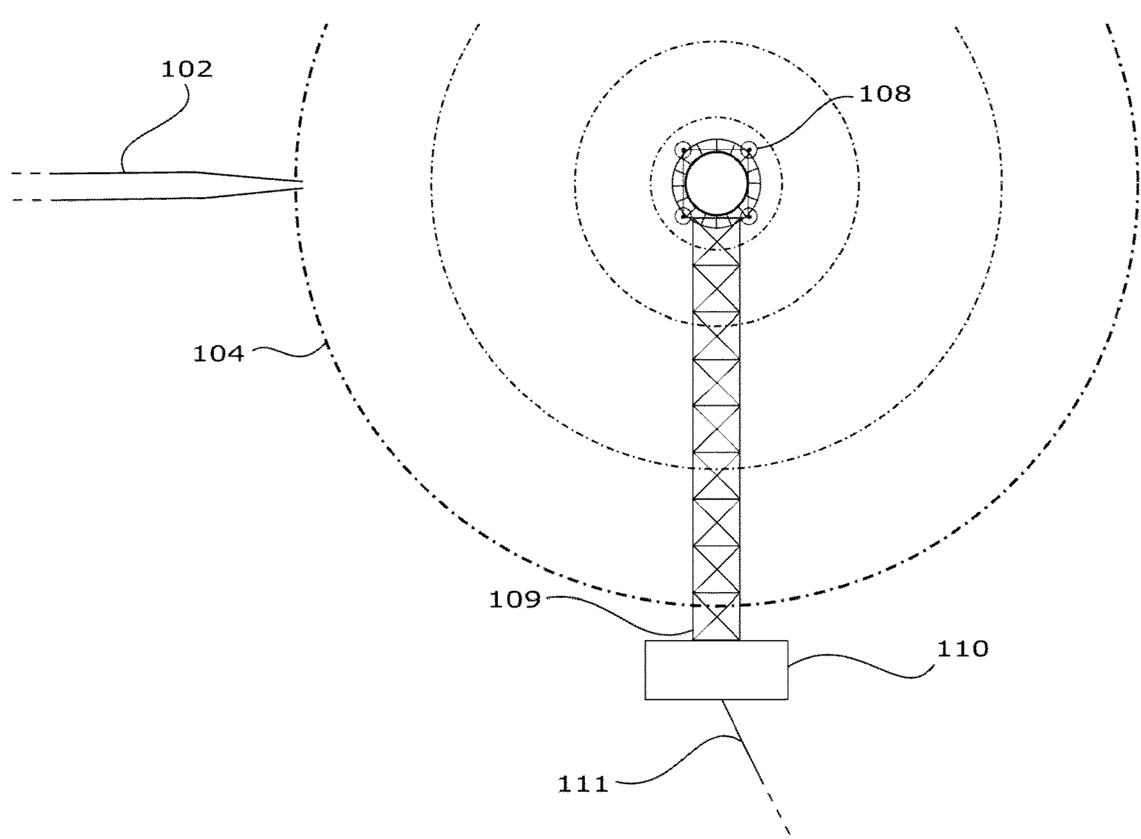
FIG. 4*a* is a front-elevation view of an airship (104) in an end-tethered “Rollable Aerostat”. The hemi-ellipsoidal end-cap is illustrated by concentric circles. It shows the external rotator including the rotating mount (108), suspension frame (109), and counterweight (110), and a ground tether (111) attached to the counterweight.
Figure 4B:
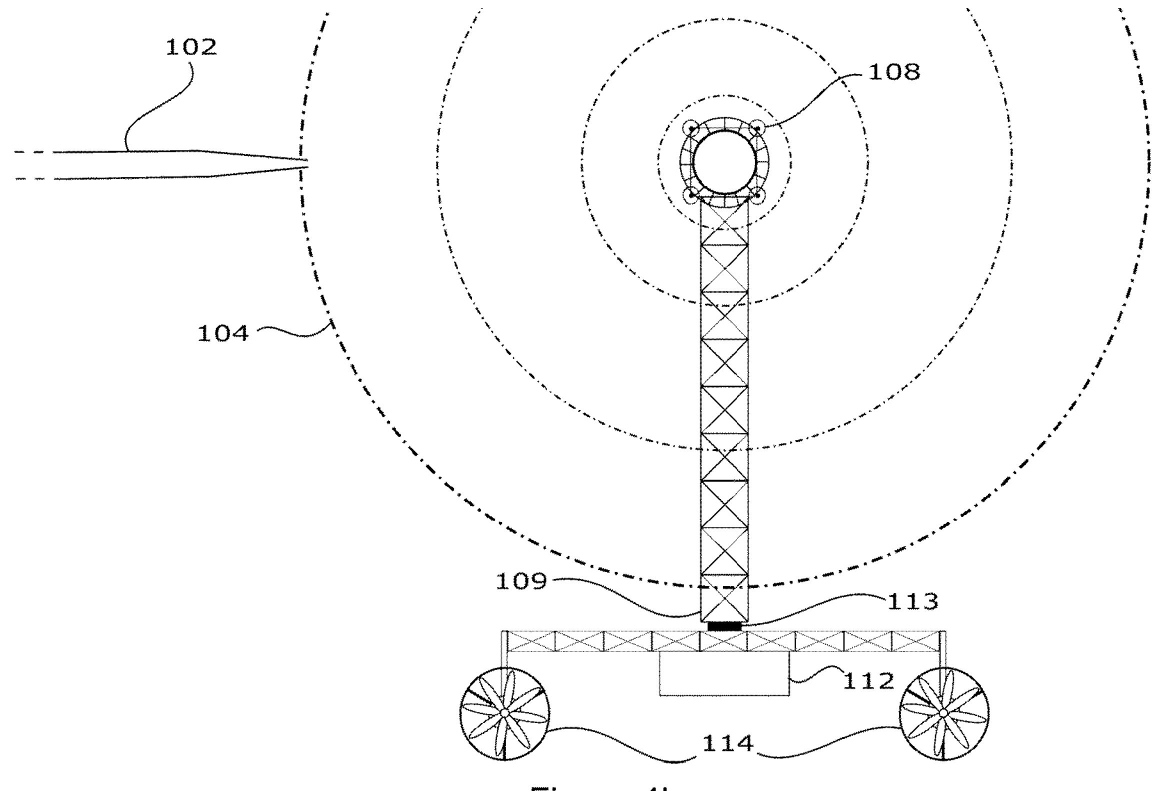
FIG. 4*b* is a front-elevation view of a connected airship (104) in an autonomous “Rollable Aerostat”, showing a multi-directional propulsion system, including tiltable thrusters (114), power storage (112), and a powered swivel (113) joining it to the suspension frame (109).
Figure 5:
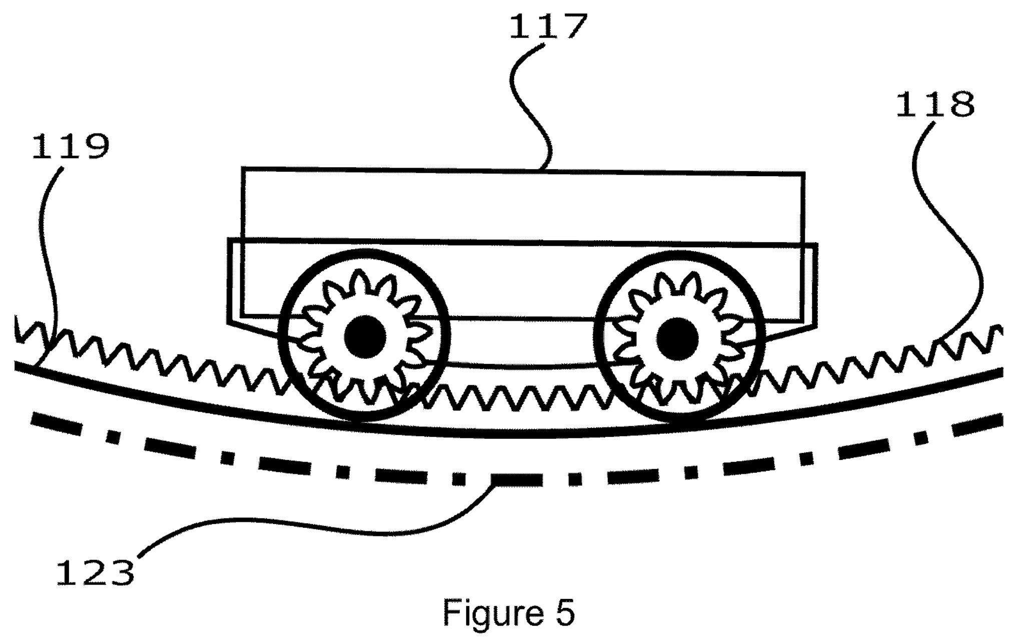
FIG. 5 shows a view of the rack rotator mechanism inside the surface of an airship (123), consisting of the circular rack (118), guide-rail (119), and railcar (117).
Figure 6:
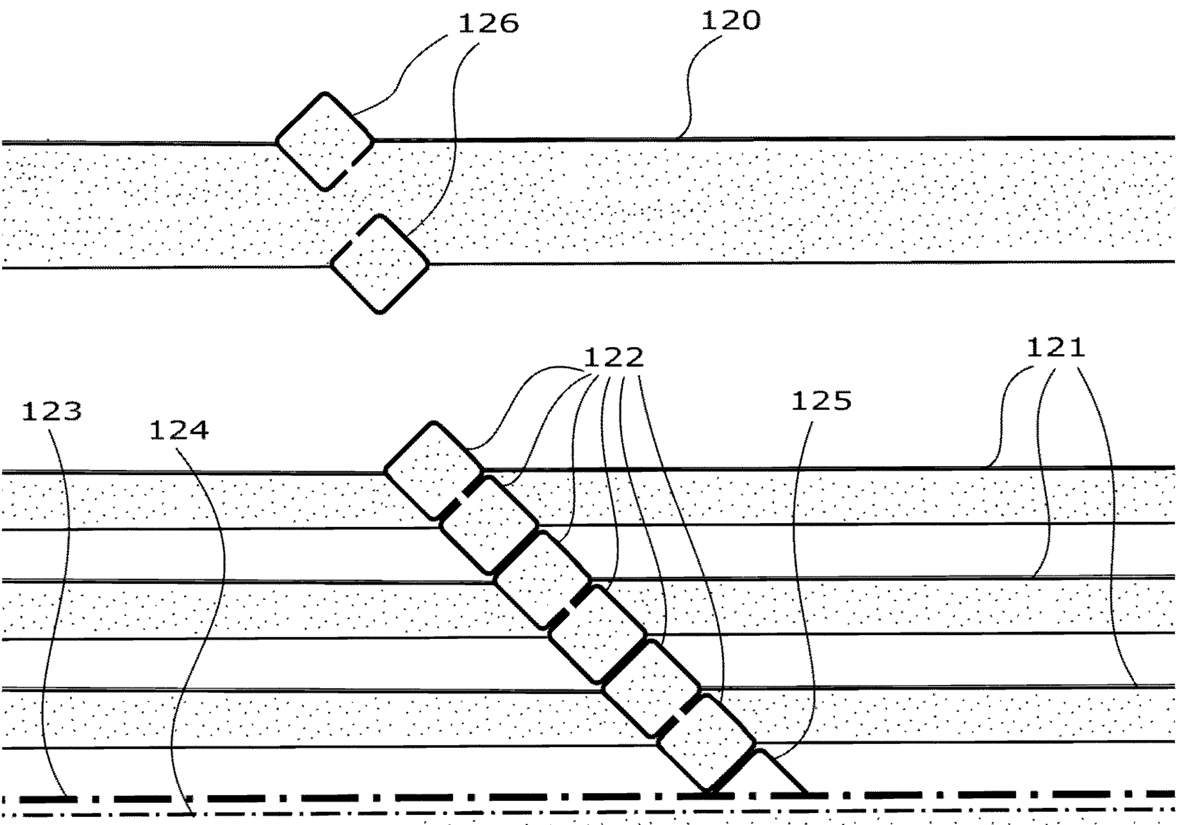
FIG. 6 shows a cross-section through an unrolling flat gas envelope including diamond cross-section pipes with perforated internal facets. In rolled segments of the envelope (121) the stacked pipes (122) sit on top of a fixed pipe-shape (125) attached to the surface of the airship (123). The internal facets of the stacked pipes (122) form a seal against each other. In the unrolling segment of the envelope (120), the exposed perforations in the internal facets of the parted pipes (126), enable lifting gas to flow from the gas cells inside the airship (124) into that segment of the envelope.
Figure 7:
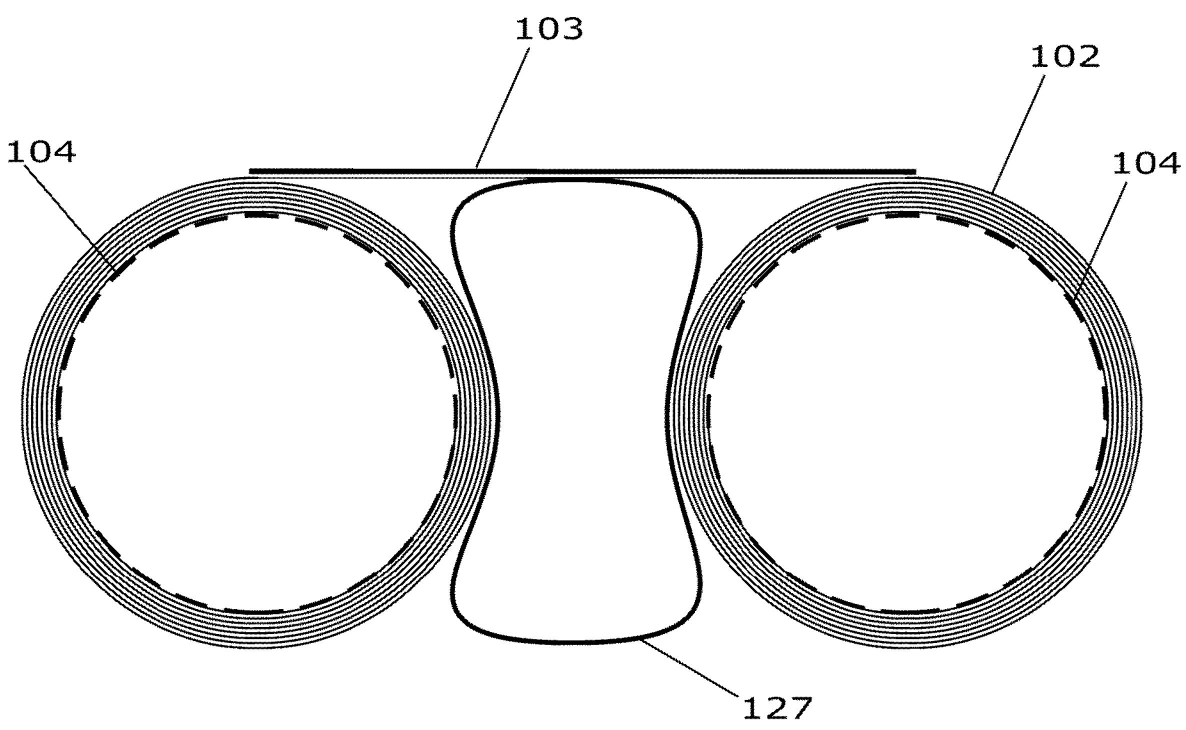
FIG. 7 is a simplified front section view of a “Rollable Aerostat”, featuring an additional central isolated aerostat body, in its stowed configuration. It shows the uninflated flat gas envelope (102) wrapped around each connected aerostat (104), and a partially-inflated semi-rigid isolated aerostat (127), which supports the weight of solar cells (103) in the middle of the flat gas envelope.
Figure 8:
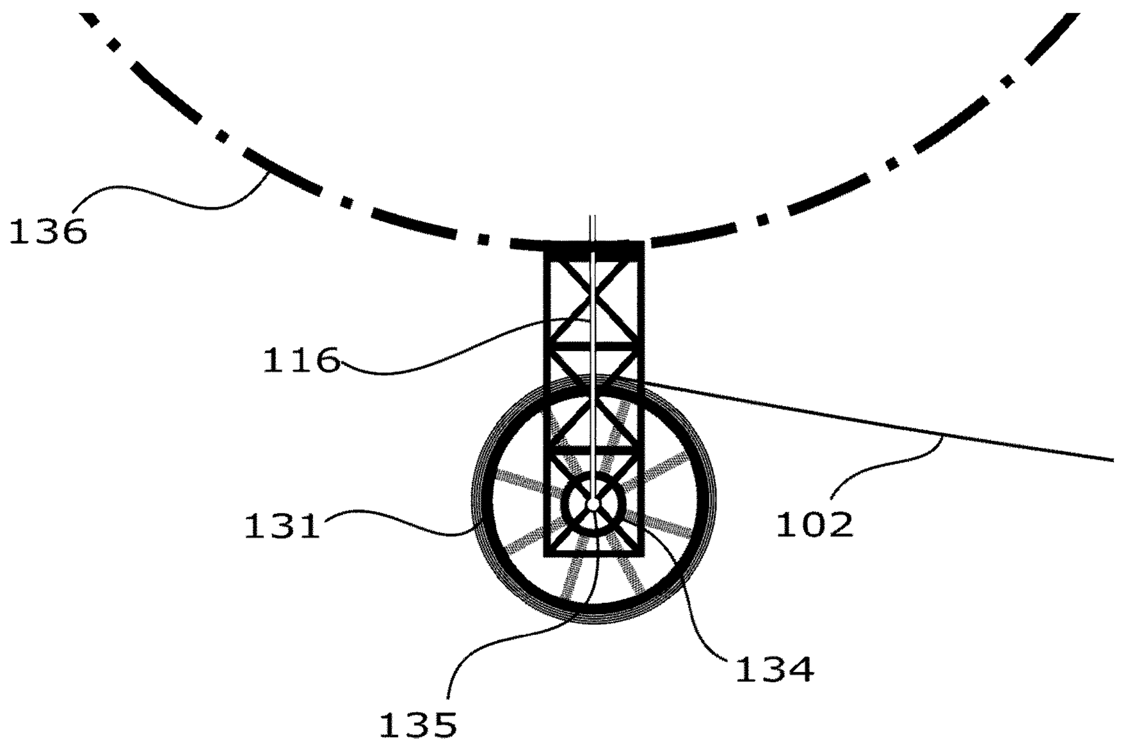
FIG. 8 shows a close-up front section of one “Suspended Roller” in its stowed configuration. A cylindrical roller (131) is suspended below a connected aerostat (136), with the uninflated flat gas envelope (102) rolled around it. Pipes (116) connect the interior volume of the connected aerostat to the flat gas envelope via a rotary union (135) on the axis of the roller. Motors (134) rotate the roller to unroll or roll the flat gas envelope.
Figures 9, 10:
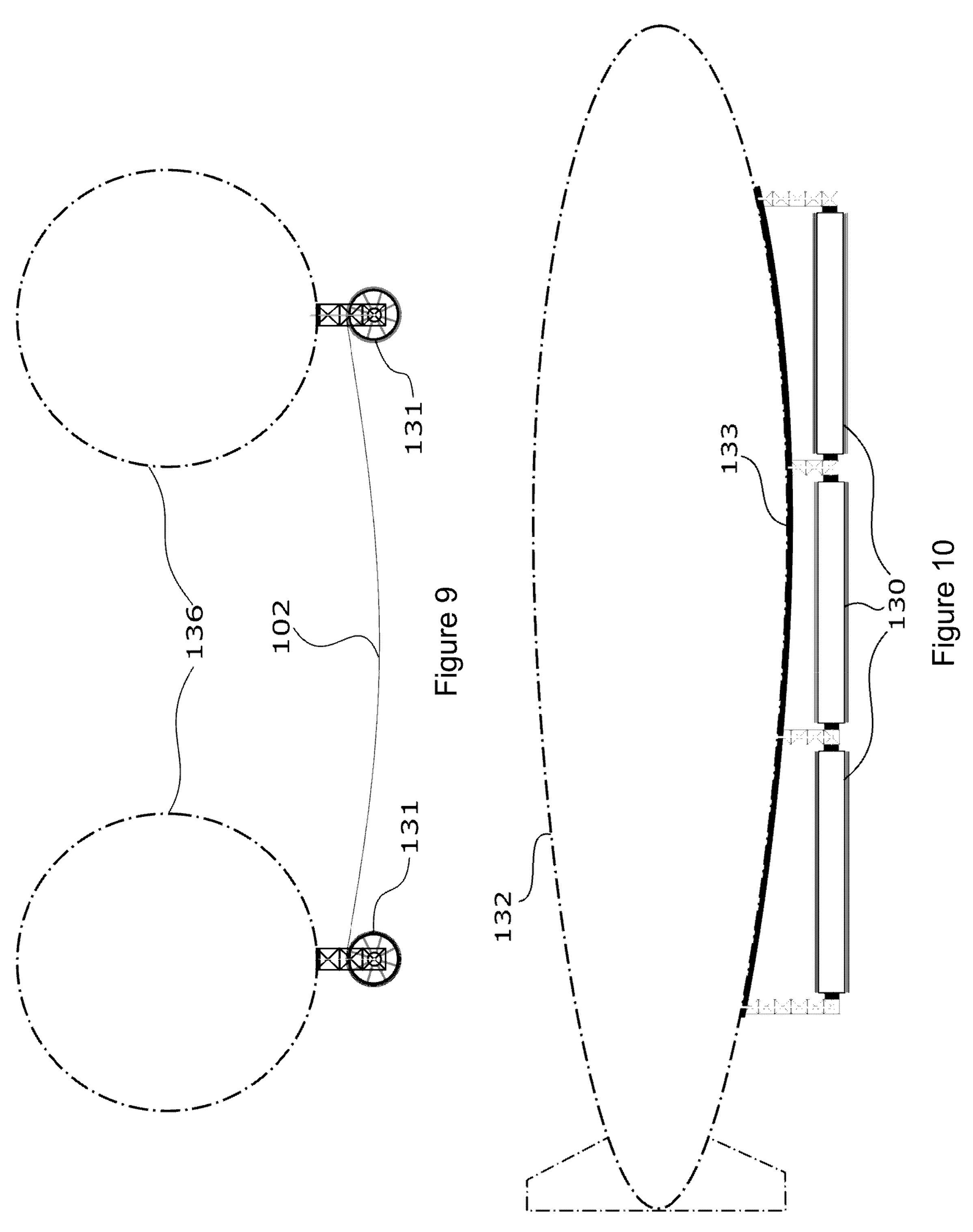
FIG. 9 shows a front section view of the “Suspended Roller” embodiment in its stowed configuration. Two end bodies (136) each include one or more aerostats. The flat gas envelope (102) is wrapped around cylindrical rollers (131) suspended below the end bodies.
FIG. 10 is a side view of the “Suspended Roller” embodiment, showing one of two ellipsoid airships (132) with three rollers (130) suspended below its keel (133).

An alternative embodiment, the "Suspended Roller", is illustrated in FIGS. 7 to 9 in the dual-connected layout. The Suspended Roller embodiment enables multi-purpose airships (132,136) of pre-existing designs, to deploy a relatively large surface. One or both ends of the flat gas envelope (102) are wound around a cylindrical roller (131), suspended below one or more aerostats.

In the Suspended Roller embodiment, the interiors of the aerostat envelopes and flat gas envelope are joined by gas pipes (116), connected via a rotary union (135) on the axis of the cylindrical roller. Motors (134) rotate the cylindrical roller to unroll and roll the flat gas envelope. By way of example but not limitation, the cylindrical rollers may be suspended below balloons (FIG. 9), ellipsoid airships (FIG. 10) or "two balloon airships" (PTL4).

Unlike the Rollable Aerostat, the roller (131) in the Suspended Roller does not support its own weight. The maximum length of a Suspended Roller is limited by its bending stiffness, because significant deflection along its length inhibits rotation.

FIG. 10 shows multiple Suspended Rollers suspended from the keel of a semi-rigid ellipsoid airship (132). Opposing pairs of suspended rollers (130) deploy parallel strips of flat gas envelope (102). The use of multiple in-line rollers enables the solution to scale to large airship designs, and enables modular designs.

The typical disadvantages of the suspended roller embodiment over the "Rollable Aerostat" embodiment are lower maximum altitude, reduced area of flat gas envelope, and reduced ability to orientate the surface of the flat gas envelope sunwards.

EXAMPLES

The airship-based examples in this section illustrate a range of possible applications, which are not intended to be exhaustive.

Figure 11:
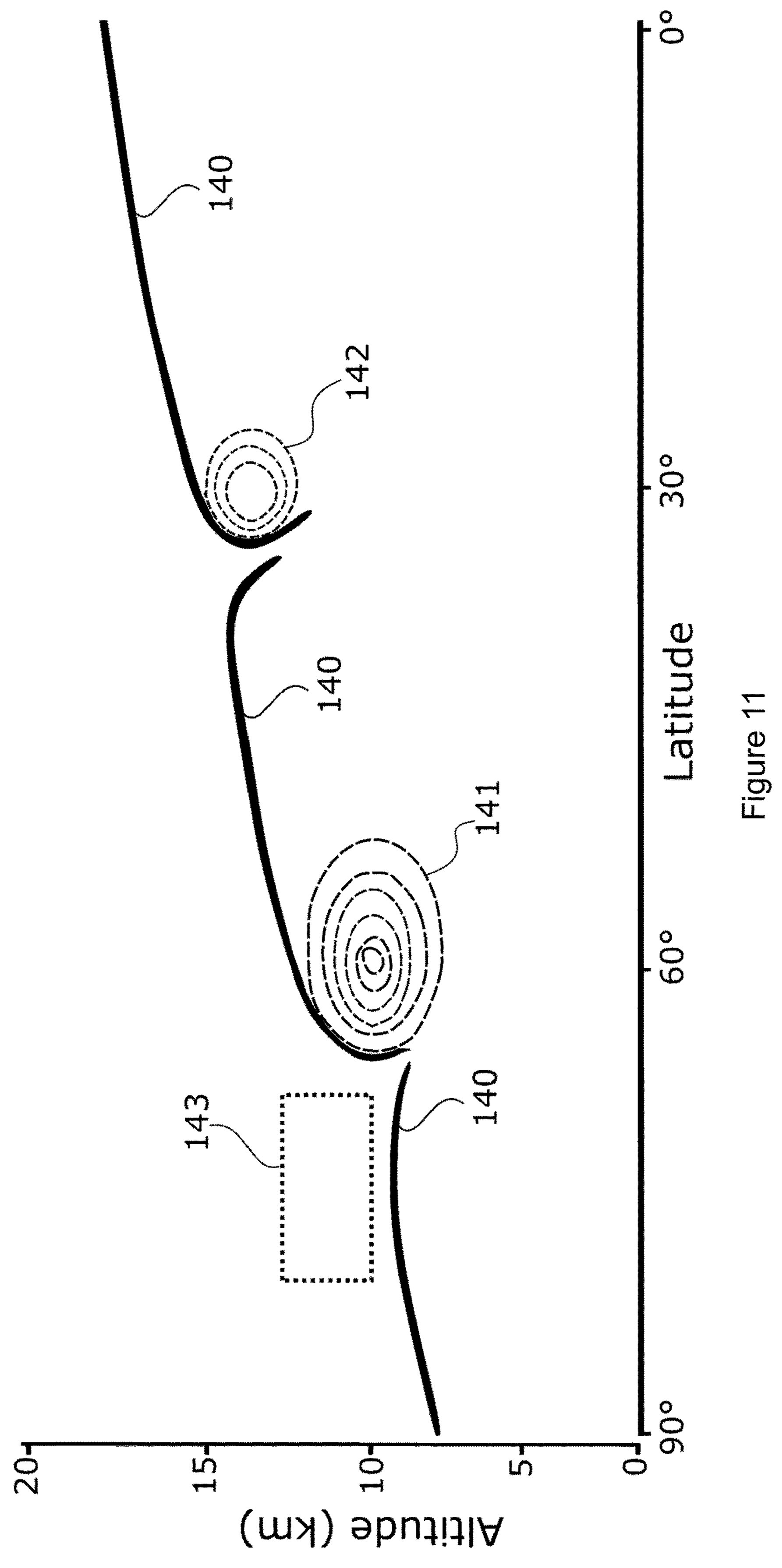
FIG. 11 Is an illustrative cross-section of the summer hemisphere showing approximate positions of the tropopause (140), polar jet or “jet stream” (141) and tropical jet (142). The dotted box (143) indicates the most accessible part of the lower stratosphere.

As illustrated in FIG. 11, the minimum altitude required to access the lower stratosphere varies between approximately 10 km near the poles to up to 20 km in the tropics. Short duration systems can be operated at lower altitudes with suitably active management.

In the summer polar stratosphere, zonal winds are relatively low (NPL2), and the sun is in the sky for a high proportion of the day, albeit at a low solar altitude angle. This comprises the most practical working environment for medium to long duration applications.

Figure 12A:
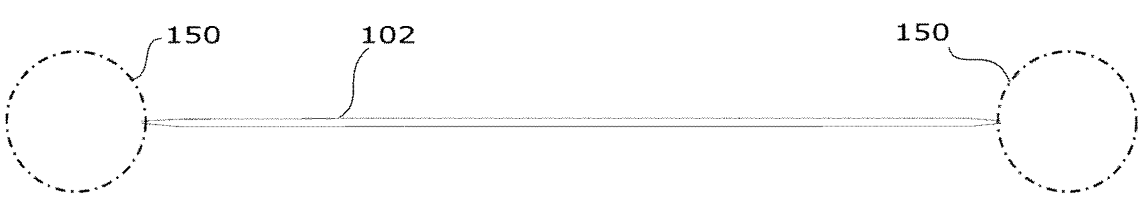
FIG. 12*a* illustrates a “dual connection” layout with two connected aerostat end-bodies (150).
Figure 12B:
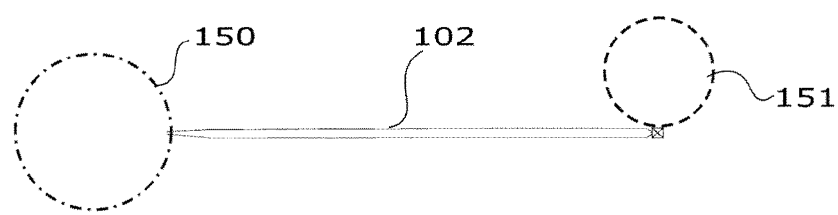
FIG. 12*b* illustrates a “mono connection” layout with one connected aerostat end-body (150) and one isolated end-body (151).
Figure 12C:
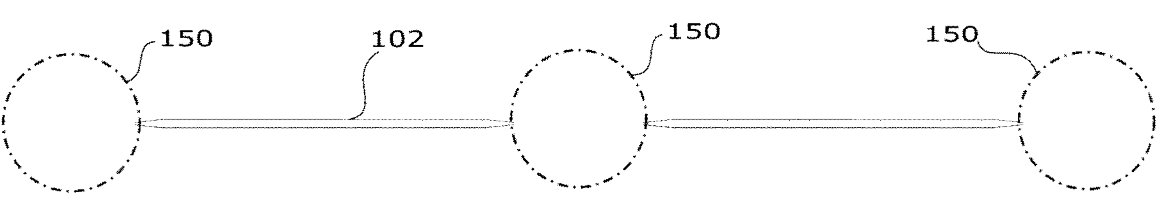
FIG. 12*c* illustrates a "triple connection" layout of two connected aerostat end-bodies (150), and one central connected aerostat body (150).
Figure 12D:
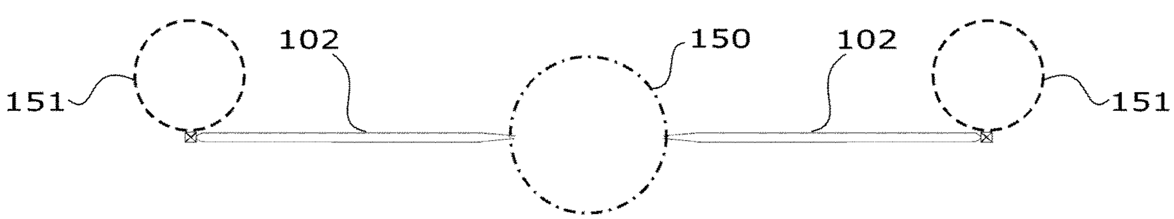
FIG. 12*d* illustrates a "central connection" layout with one connected aerostat end-body (150) and two isolated end-bodies (151).
Figure 12E:
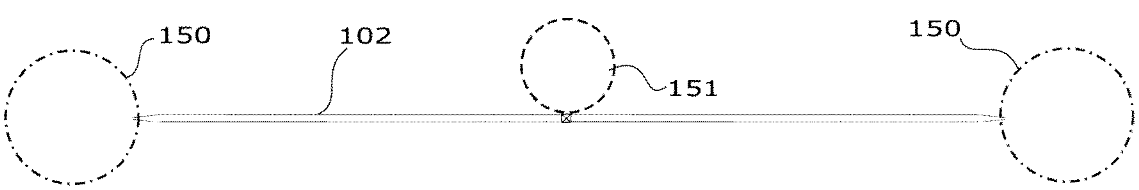
FIG. 12*e* illustrates a "dual connection" layout with two connected aerostat end-bodies (150), and a central isolated aerostat body (151).

The following information and assumptions are used in estimating the dimensions and properties of the examples in this section:

- The deadweight of an airship is approximately proportional to its surface area.
- The deadweight of rigid airships constructed with modern materials can be 50% lower than historic designs.
- The gas envelopes of an airship can occupy 90% of its internal volume.
- High albedo surfaces or coatings of areal densities less than 200 $g/m^2$ are available.
- Ultrathin photovoltaic films, optimised for the solar spectrum at high altitudes, are available at areal densities less than 200 $g/m^2$ (NPL5).
- The mean areal density of the flat gas envelope can be 500 $g/m^2$, based on
  - two surfaces of flat gas envelope of 100 $g/m^2$ (NPL4)
  - reinforced with carbon fibre yarns
  - connected by carbon fibre tendons
  - a radiatively-active layer of 250 $g/m^2$
- The examples all use the dual-connection layout shown in FIG. 12*a*
- Weight of ground tethers and any high-tension electrical cables, can be supported by supplementary buoyancy.

Table 1 sets out approximate values for the key properties of various example classes (A to F) of rollable aerostats and suspended rollers, based on the above information and assumptions, and using the equation (1) and equation (2) above.

TABLE 1

Example Classes of Rollable Aerostat and Suspended Roller Systems

| Class | Embodiment | Target Altitude | Aerostat Bodies (each) Description | Length | Radius* | Dead weight | Flat Envelope Length | Full Width | Surface Area | Area Expansion Ratio |
|---|---|---|---|---|---|---|---|---|---|---|
| A | Rollable Aerostat | 8 km | Rigid cylindrical airship | 75 m | 7.5 m | 3.4 t | 60 m | 700 m | 42,000 $m^2$ | 20 |
| B | Rollable Aerostat | 16 km | Rigid cylindrical airship | 240 m | 20 m | 30 t | 200 | 5 km | 1 $km^2$ | 60 |
| C | Rollable Aerostat | 20 km | Semi-rigid cylindrical airship with internal bracing | 140 m | 20 m | 10 t | 100 m | 6.5 km | 650,000 $m^2$ | 60 |
| D | Rollable Aerostat | 22 km | Rigid inflatable frame cylindrical airship | 264 m | 32 m | 36 t | 200 m | 15 km | 3 $km^2$ | 100 |
| E | Suspended Roller | 15 km | Two-balloon airship (PTL4) with single suspended roller | 58 m | 9 m | 1 t | 40 m | 2 km | 60,000 $m^2$ | 50 |
| F | Suspended Roller | 8 km | Ellipsoid rigid airship with multiple suspended rollers | 169 m | 27 m | 25 t | 140 m | 2 km | 300,000 $m^2$ | 30 |

*Radius refers to either the radius of the cylindrical airship body (Class A-D), the radius of balloons (Class E), or the maximum radius of an ellipsoid airship (Class F).

Example 1: Electricity Platform, based on an end-tethered Class A system. Used to generate solar electricity in locations where there is insufficient land for ground-based solar panels. Operated during daylight, and returned to ground at night, and whenever strong winds are forecast. Small and robust enough to enable regular ground handling and storage. A layer of ultrathin photovoltaic film covering 40,000 $m^2$ of the flat gas envelope generates approximately 40 MWh of energy per day in midlatitudes.

Example 2: Pole Protector, based on an autonomous Class B system. This long duration system is deployed in polar regions during the summer to shade the ocean adjacent to melting sea ice. It can help preserve multi-season ice floes in areas such as the Beaufort Gyre, where approximately 3,000 systems can reduce net insolation by 1%. The system can be transported between hemispheres during equinoctal periods.

Example 3: Hydrogen Production Platform based on a Class B system. The Rollable Aerostat is tethered to a surface ship via a central airship. Electricity generated by a layer of ultrathin photovoltaic film, is transmitted to the surface ship and used to electrolyse seawater. Approximately 2,000 tons of hydrogen can be produced each month. The platform operates near each pole for 3 to 4 months during summer, and travels between hemispheres during equinoctal periods.

Example 4: Interhemispheric Pole Protector based on the Class C or Class D example system. An autonomous long-duration solar reflector which remains in the stratosphere for years at a time. It spends most of its time over the summer pole, but is able to cross the equator during equinoctal periods whilst remaining above the tropopause. Relatively safe from atmospheric disturbance, it still avoids major storms when possible, because of the risk from upper atmospheric lightning, such as the phenomenon known as a "blue jet".

Example 5: Glacier Shade, based on the Class E example system. Used to shade valley walls and debris-covered ice in the vicinity of high-latitude glaciers during summer. It can be transported in component form to a remote location, and assembled and inflated onsite. Carbon fibre composite tethers hold it in position. In mid-summer, it can reduce insolation for a low-albedo area by up to 400 megawatt-hours per day.

Example 6: "Artificial cloud" based on the Class F example system. Used to shadow a sensitive area of land or sea during daylight hours. In mid-latitudes in mid-summer, it can reduce insolation for a low-albedo area by up to 2,000 megawatt hours per day.

INDUSTRIAL APPLICABILITY

The invention can be made in the aerospace industry, and used in the energy, geoengineering or climate adaptation industries.

REFERENCE SIGNS LIST

The references signs used are as follows:

101. Depth-constraining structures
102. Flat envelope
103. Solar cells
104. Cylindrical airship
105. Motors for rotating the cylindrical airship
106. Central spine of the cylindrical airship
107. Large gear
108. Rotating mount
109. Suspension frame
110. Counterweight
111. Ground tether
112. Power storage
113. Powered swivel
114. Thruster
115. Cable
116. Gas pipe
117. Railcar
118. Rack rail
119. Guide rail
120. Unrolling segment of the flat gas envelope
121. Rolled segment of the envelope
122. Stacked perforated-pipes
123. Surface of an airship
124. Gas cell inside an airship
125. Fixed pipe shape
126. Parted perforated-pipes
127. Semi-rigid aerostat body
130. Suspended roller

131. Cylindrical roller
132. Ellipsoid airship
133. Keel
134. Motor for turning the cylindrical roller
135. Rotary union
136. General aerostat body, incorporating one or more aerostats
140. Approximate positions of the tropopause
141. Polar jet or "jet stream"
142. Tropical jet
143. Box indicating the most accessible part of the lower stratosphere
150. Connected aerostat of any type
151. Isolated aerostat of any type (can be optional in smaller systems)

CITATION LIST

Patent Literature

PTL1: US 133621015 Stratosphere tethered photovoltaic power platform
PTL2: US20200386970A1 Aerostatically Stabilized Atmospheric Reflector To Reduce Solar Irradiance
PTL3: WO2015065433A1 Rigid airship utilizing a rigid frame formed by high pressure inflated tubes
PTL4: U.S. Pat. No. 8,061,647B1 High altitude two balloon airship
PTL5: U.S. Pat. No. 5,538,203A Ballonet system for a lighter-than-air vehicle
PTL6: US20070034740 Transformable airship
PTL7: U.S. Pat. No. 7,997,532B2 Airborne power station
PTL8: US20130126675A1 Durable airship hull and in situ airship hull repair
PTL9: U.S. Pat. No. 8,800,628B2 Self-propelled airship hull repair system
PTL10: U.S. Pat. No. 9,246,433B2 Airborne Photovoltaic Solar Device And Method
PTL11: U.S. Pat. No. 11,459,080B2 Transformable Stratospheric Airship
PTL12: WO2021068457A1 Stratospheric airship of large-scale rigid and flexible integrated structure Non Patent Literature NPL1: *Evolution of the Rigid Airship Design*, Baron L. d'Orcy, Scientific American, Vol. 115, No. 26 (Dec. 23, 1916), p. 576, 579, 581
NPL2: *Airships: A New Horizon for Science*, Keck Institute for Space Studies, 2013
NPL3: Weinan et al., "*A novel inflatable rings supported design and buoyancy-weight balance deformation analysis of stratosphere airships*." Chinese Journal of Aeronautics, Volume 35, Issue 1, January 2022, Pages 340-347
NPL4: Vallabh et al. "*Ultra-lightweight fiber-reinforced envelope material for a high-altitude airship*." The Journal of The Textile Institute (2021): 1-7.
NPL5: Papež et al, "*Overview of the Current State of Gallium Arsenide-Based Solar Cells*". Materials 2021, 14,3075.

The invention claimed is:

1. A variable volume aerostat which can expand its surface area, comprising:

one or more strips of flat gas envelope, made of a material which is impervious to a lifting gas;

depth-constraining structures which constrain the depth of the flat gas envelope;

aerostat bodies, in the form of airships or balloons, joined to the flat gas envelope;

openings or pipes which enable the lifting gas to flow between gas cells inside one or more of the aerostat bodies and the interior of the flat gas envelope;

wherein in a stowed configuration, the flat gas envelope is uninflated, and the gas cells inside the aerostat bodies contain virtually all of the lifting gas;

and wherein in a deployed configuration, lifting gas fills the flat gas envelope, which is fully extended and self-supporting, and presents a top-down planar area larger than the area presented by the aerostat bodies.

2. The variable volume aerostat according to claim 1, further comprising pipes along the width of the flat gas envelope, wherein the flow of lifting gas between said flat gas envelope and the gas cells inside one or more of said aerostat bodies is expedited.

3. The variable volume aerostat according to claim 2 further comprising: division of said flat gas envelope into separate sections along its width; a series of active or passive valves in said pipes which control the flow of lifting gas between the internal envelope and individual sections of said flat gas envelope; wherein during ascent, lifting gas expanding from the internal envelope of one or more of said aerostat bodies, is directed into the section of said flat gas envelope that is being unrolled or unfolded; and wherein during descent, lifting gas is directed out of the section of said flat gas envelope that is being rolled or folded, into gas cells inside said aerostat bodies.

4. The variable volume aerostat according to claim 1, additionally comprising:

a cylindrical structure at one or either end of said flat gas envelope, which is able to rotate on the longitudinal axis and act as a roller;

non-rotating attachment points, joined to the ends of the longitudinal axis of said roller or rollers via rotating mounts;

wherein the uninflated flat gas envelope can be rolled onto said roller or rollers before the variable volume aerostat ascends;

wherein the flat gas envelope can be unrolled from said roller or rollers, and be inflated with lifting gas, as the variable volume aerostat ascends;

wherein the deflating flat gas envelope can be rolled back onto said roller or rollers as the variable volume aerostat descends; and wherein any tethers, propulsion systems, supplemental buoyancy, or other non-rotating structures, can be attached to a roller at non-rotating external attachment points on the longitudinal axis.

5. The variable volume aerostat according to claim 4, further comprising: matching holes in the opposing surfaces of said pipes; a sealing coating on the opposing surfaces of said pipes; and wherein the holes act as a passive valve, by being sealed to the movement of lifting gas when pressed together.

6. The variable volume aerostat according to claim 4, forming a rollable aerostat, wherein: said roller or rollers are also said aerostat bodies, being formed of a rotatable airship which has a main body in the approximate shape of a cylinder; in the stowed configuration, said flat gas envelope is uninflated, and rolled around the rotatable airship or airships; as the variable volume aerostat ascends, said flat gas envelope is unrolled by controlled rotation of the rotatable airship, and inflates with lifting gas expanding from the gas cells inside the rotatable airship; in the deployed configuration, said flat gas envelope is fully unrolled, and has been filled with sufficient lifting gas to make it neutrally buoyant; and as the variable volume aerostat descends, said flat gas envelope is rolled around the body of the ratable airship during controlled rotation, pushing the lifting gas back into gas cells inside the rotatable airship.

7. The variable volume aerostat according to claim 6, additionally comprising: an external rotator, suspended below said external attachment point;

energy storage or other mass mounted on the external rotator at a distance from the longitudinal axis of said rotatable airship;

motors, gears and control mechanisms attached to said rotating mount;

and an onboard control system;

wherein the off-axis weight of the external rotator provides a restoring torque;

and wherein the off-axis buoyancy of any supplementary buoyancy provides a restoring torque;

and wherein a torque applied through each rotating mount, rotates said rotatable airships.

8. The variable volume aerostat according to claim 6, further comprising:

one or more internal rotators, suspended along the longitudinal axis in the interior of said rotatable airship, via a rotating mount;

energy storage or other mass mounted on the internal rotator, at a distance from the longitudinal axis of a rotatable airship;

motors, gears and control mechanisms attached to each rotating mount;

wherein a torque applied through each rotating mount, rotates said rotatable airship, in reaction to the restoring torque provide by the off-axis weight;

and wherein the combined weight of the internal rotators and said external rotators, is more evenly distributed along the length of said rotatable airship;

and wherein said rotatable airship can be rotated, without having to overcome deflection along its longitudinal axis, caused by uneven weight distribution.

9. The variable volume aerostat according to claim 6, further comprising a rack-and-pinion rotator system consisting of:

one or more ring rails, consisting of a rack rail and parallel guide rails, mounted around the inner or outer circumference of said rotatable airship;

a railcar carrying a counterweight which can be driven along the rack rail by rotating pinions;

a live rail or spark-safe electrical connection points, to enable the self-driving car to exchange electricity with the main electrical system;

wherein the railcar applies a torque about the longitudinal axis of said rotatable airship, proportional to the sine of the angle between its position and vertical;

and wherein the off-axis weight used to rotate said rotatable airship, is more evenly distributed along the length of said rotatable airship;

and wherein said rotatable airship can be rotated without having to overcome deflection along its longitudinal axis, caused by uneven weight distribution.

10. The variable volume aerostat according to claim 9, further comprising:

longitudinal rack rails which intersect with said ring rails around the circumference of said rotatable airship;

rotating intersections between said ring rails and straight rails;

wherein said railcar can be moved longitudinally between different ring rails;

and wherein the centre of mass of said rotatable airship can be moved forward or aft, for the purpose of controlling its pitch.

11. The variable volume aerostat according to claim 4, additionally comprising structures which suspend said rollers below said aerostat bodies; rotating joints, which include rotary unions, connecting said pipes from the aerostat bodies to said flat gas envelope, at the axis of said rollers motors and control systems for rotating said rollers; wherein the flat gas envelope can be unrolled or rolled by rotating said roller or rollers; and wherein lifting gas can move between the gas cells inside the aerostat bodies and the flat gas envelope.

12. The variable volume aerostat according to claim 1, additionally comprising a multi-directional propulsion system, including thrusters, energy storage and a control system, attached to said aerostat bodies, wherein: the relative position of said aerostat bodies can be accurately controlled; the variable volume aerostat can change its orientation, position and speed; and a lateral stretching force can be exerted along the width of said flat gas envelope, by using the multi-directional propulsion system to separate said aerostat bodies.

13. The variable volume aerostat according to claim 1, additionally comprising one or more tethers attaching the variable volume aerostat to winches at the Earth's surface, or mounted on a lower altitude vehicle, wherein the variable volume aerostat can ascend to high altitude whilst its geographic position is controlled by the force exerted through the tethers.

14. The variable volume aerostat according to claim 4, additionally comprising tethers attached to said non-rotating external attachment points, and to winches separated by more than the full width of said flat gas envelope, and motors and a control system which control the rotation of the roller, wherein:

in the stowed configuration said tethers are withdrawn, most of said flat gas envelope is rolled, and rotation of the rollers is locked; during deployment, said tethers are steadily unwound, allowing the variable volume aerostat to ascend;

as the variable volume aerostat ascends, the force exerted by the tethers is allowed to steadily rotate said rollers whilst maintaining some tension in said flat gas envelope, unrolling said flat gas envelope, which fills with lifting gas; and in the deployed configuration, the force exerted by the tethers continues to maintain the position of the variable volume aerostat and the tension in said flat gas envelope.

15. The variable volume aerostat according to claim 4, further comprising two drums at either end of each of said rollers, and pairs of tethers counter-wound around the two drums, wherein differential tension applied to the tethers can be used to rotate said rollers in order to unroll or roll said flat gas envelope.

16. The variable volume aerostat according to claim 1, further comprising designed points of folding, using differential length or differential elasticity in said depth-constraining structures, wherein:

said flat gas envelope has a natural tendency to fold due tithe differential buoyancy between the deepest and shallowest parts of the envelope;

relaxation of the stretching tension applied at said aerostat bodies causes said flat gas envelope to fold;

and the width and surface area of said envelope can be reduced during hours of darkness.

17. The variable volume aerostat according to claim 1, further comprising an additional central airship attached near the middle of said flat gas envelope, wherein:

additional weight near the middle of said flat gas envelope can be supported byte buoyancy of the central airship;

the central airship can be used as an attachment point for tethers or cables connecting the variable volume aerostat tithe ground or a lower altitude craft;

and if of a non-rigid type, the central airship can act as a physical buffer between two of said aerostat bodies at the ends of said flat gas envelope.

18. The variable volume aerostat according to claim 17, further comprising a system of variable buoyancy in said central airship, such as "ballonets", wherein a change in the buoyancy of said central airship can be used to help put said flat gas envelope into a "v" shape, wherein the radiatively-active surface area is significantly reduced.

19. The variable volume aerostat according to claim 1, wherein said flat gas envelope has a top layer or coating of high albedo, wherein a high proportion of incident solar radiation is reflected back into space, wherein during hours of daylight, there is a net cooling the area on the Earth's surface that is shadowed by the variable volume aerostat.

20. The variable volume aerostat according to claim 1, additionally comprising:

a layer of ultrathin photovoltaic film on the top surface of said flat gas envelope;

connecting conductors;

electricity control systems; and electricity storage and/or transmission systems;

wherein during the hours of daylight, large amounts of incident solar radiation is converted into electricity.

* * * * *